G. M. MIZE.
PEANUT AND POTATO HARVESTER.
APPLICATION FILED NOV. 30, 1915.
1,239,935.
Patented Sept. 11, 1917.
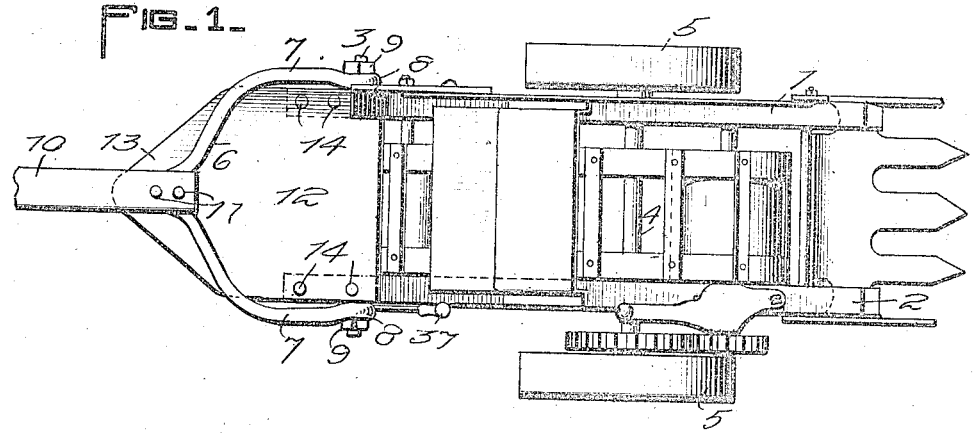
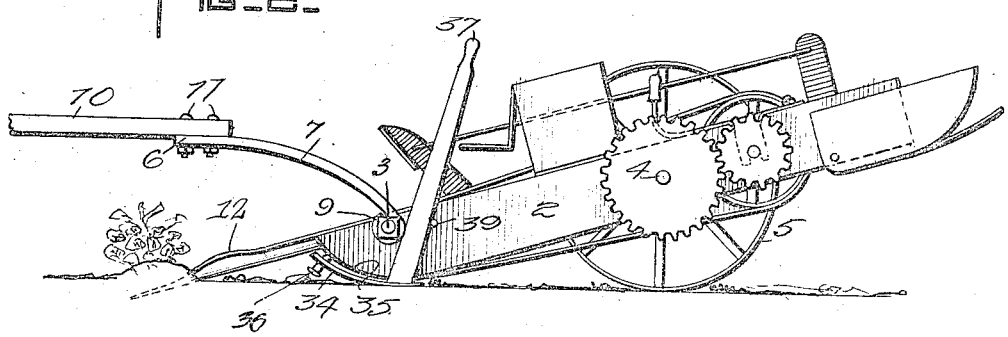
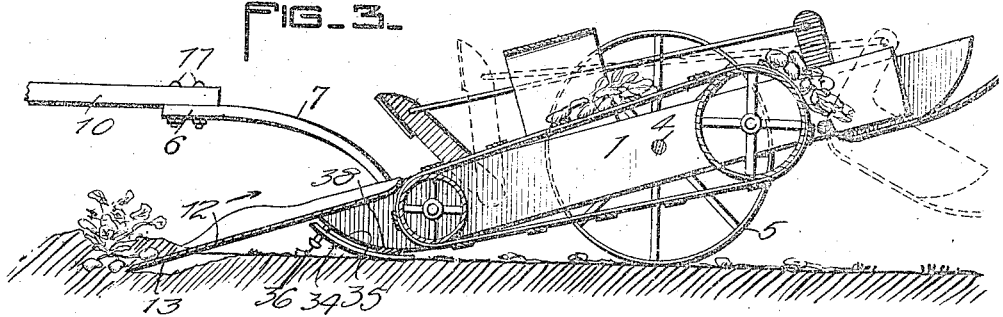
WITNESSES:
INVENTOR
George M. Mize,
BY Munn & Co.
ATTORNEYS

UNITED STATES PATENT OFFICE.

GEORGE M. MIZE, OF DE QUEEN, ARKANSAS, ASSIGNOR OF ONE-HALF TO WILLIAM F. WOOD, OF DE QUEEN, ARKANSAS.

PEANUT AND POTATO HARVESTER.

1,239,935.

Specification of Letters Patent.

Patented Sept. 11, 1917.

Application filed November 30, 1915. Serial No. 64,290.

*To all whom it may concern:*

Be it known that I, GEORGE M. MIZE, a citizen of the United States, and a resident of De Queen, in the county of Sevier and State of Arkansas, have invented a new and useful Improvement in Peanut and Potato Harvesters, of which the following is a specification.

My invention is an improvement in peanut and potato harvesters, and the invention has for its object to provide a machine of the character specified, for lifting the peanuts or potatoes from the hills and for lifting the plow from the ground during transportation.

In the drawings:—

Figure 1 is a top plan view of the improved machine,

Fig. 2 is a side view,

Fig. 3 is a longitudinal vertical section.

The present embodiment of the invention comprises a wheel supported frame, consisting of spaced parallel connected beams or bars 1 and 2. An axle 4 is journaled transversely of the beams 1 and 2, and wheels 5 are secured to the ends of the axle. Draft mechanism in the form of a bail comprising a body 6 and arms 7 is connected with the front end of the frame by bolts 3, the arms having eyes 8, which engage the ends of the bolt, and nuts 9 are threaded on to the ends of the bolts to hold the eyes in place.

A tongue 10 is secured to the body 6 of the bail by means of bolts and nuts 11, and a plow is connected to the front ends of the beams 1 and 2 at the bail. This plow is a scoop or scraper, consisting of a sheet 12 of metal concavo-convex from side to side and having its front end beveled to form a point 13. The plow is arranged with the concave surface upward and it is secured to the upper edges of the beams 1 and 2 at the front ends thereof by means of screws or bolts 14. The plow enters the ground as shown more particularly in Fig. 3, with the point 13 below the level of the potatoes or peanuts in the hill, and the plow scoops up the peanuts or potatoes.

Means are provided also for lifting the front end of the frame to lift the plow out of engaging position, the said means comprising a transversely curved plate 34, which is arranged at the front and under side of the beams 1 and 2. The said beams have their lower front corners rounded as shown at 35, and the plate 34 is curved to fit these rounded ends. This plate has openings at its front or upper edge, and headed pins 36 are passed through the openings into engagement with the ends of the beams 1 and 2, near their upper edges.

The plate is mounted loosely on these pins, and a lever 37 is provided for moving the rear edge of the plate downward to lift the front end of the frame. The frame is balanced on the wheels so that they will normally occupy the positions shown in Figs. 2 and 3, but it is so nearly balanced that there is no difficulty in lifting the front end of the frame with slight exertion.

This lever 37 has an angular portion 38, which is secured transversely of the upper face of the plate 34, near its rear edge, and a pin 39 is provided for holding the lever 37 in adjusted position. When the lever 37 is in front of the pin the parts occupy the position shown in Figs. 2 and 3, while when the lever is in rear of the pin the plate 34 will be swung to lift the front ends of the beams 1 and 2.

In operation, the machine is drawn through the field by draft animals which are connected with the tongue 10. When the operator is ready to dig potatoes or peanuts, he places the parts in the position of Figs. 1 and 2 with the point of the plow at the center of the row to be dug. When now the machine is drawn forward the point of the plow will run beneath the potatoes or peanuts in the hill as shown in Fig. 3, and the said peanuts, potatoes and vines will be lifted from the ground.

I claim:—

1. A machine of the character specified, comprising a frame, wheels on the frame intermediate the ends thereof, the front end of the frame carrying a digging blade and being adapted to normally rest upon the ground, and means at the said front end for raising and lowering the frame, said means comprising a curved plate upon which the said front end of the frame rests, the rear end of the plate being detached from the frame and having an upwardly extending handle for locking the plate with respect to the frame to raise and lower said frame.

2. A machine of the character specified, comprising a wheel supported frame adapted to run at its front end upon the ground and carrying digging means at the said end, and means for raising and lowering the said end, said means comprising a curved plate connected to the frame at the front thereof to rock upon the frame, and having a handle for rocking the same.

GEORGE M. MIZE.

Witnesses:
L. E. COOPER,
T. O. POOLE.